United States Patent [19]

Le Blanc

[11] 3,957,146

[45] May 18, 1976

[54] AUTOMATIC ADJUSTER WITH CUTTER FOR FRICTION COUPLINGS

[75] Inventor: Walter J. Le Blanc, Pecos, Tex.

[73] Assignee: The B. F. Goodrich Company, Akron, Ohio

[22] Filed: Feb. 19, 1975

[21] Appl. No.: 551,169

[52] U.S. Cl. ............................ 192/111 A; 188/71.8; 188/196 P
[51] Int. Cl.² .................... F16D 13/60; F16D 55/02
[58] Field of Search ............... 192/111 A, 111 R; 188/71.8, 196 D, 196 P

[56] References Cited
UNITED STATES PATENTS

| | | |
|---|---|---|
| 2,888,109 | 5/1959 | Tankersley .................. 188/196 P |
| 3,542,165 | 11/1970 | Lucien .......................... 188/71.8 X |
| 3,566,996 | 3/1971 | Crossman .................... 188/71.8 X |
| 3,580,365 | 5/1971 | Bialkowski .................. 188/71.8 X |

Primary Examiner—Benjamin W. Wyche
Assistant Examiner—Lance W. Chandler

[57] ABSTRACT

A brake retractor assembly in which the automatic adjustment mechanism includes a tube and a cutter engageable with the tube upon relative movement thereof. The tube is mounted on the retractor for limited axial movement in a manner such that after a predetermined movement of the cutter and tube together, there is relative movement thereof and the tube is cut by the cutter an amount equal to the wear of the brake parts providing the necessary adjustment to compensate for the wear.

9 Claims, 7 Drawing Figures

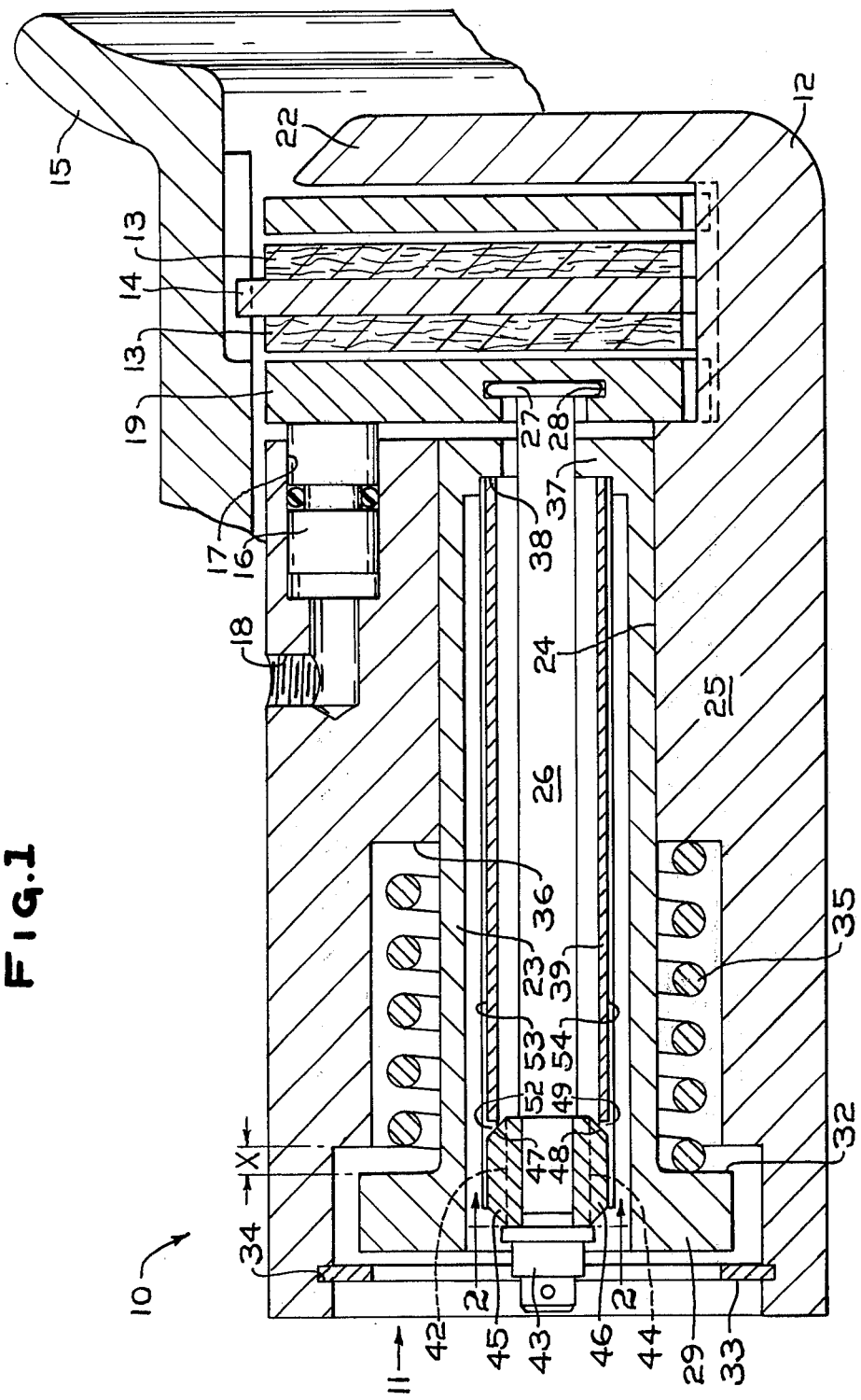

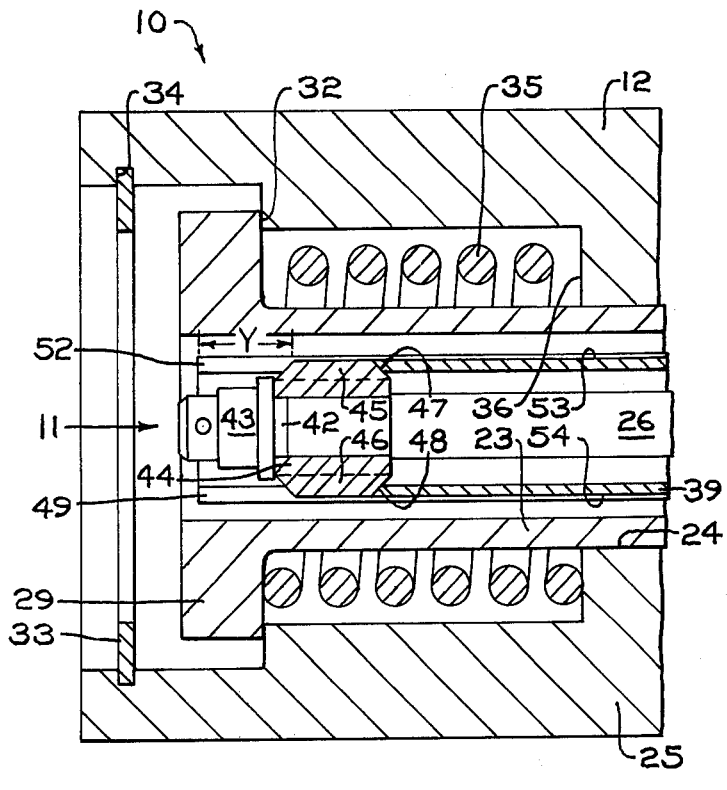
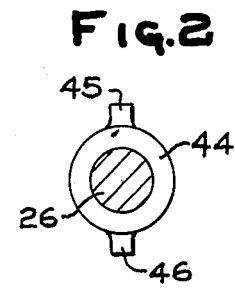
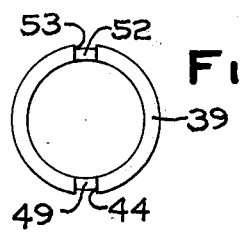
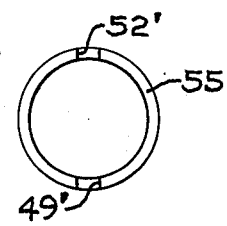
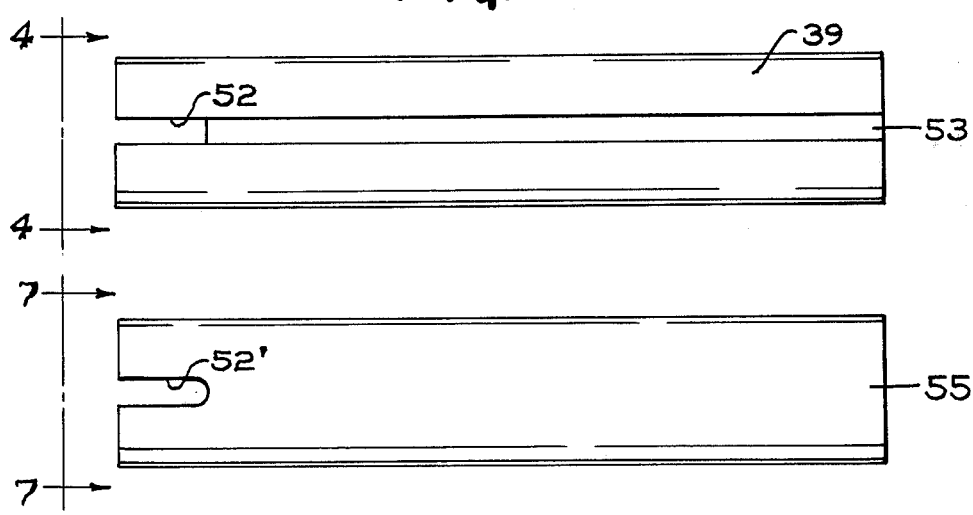

AUTOMATIC ADJUSTER WITH CUTTER FOR FRICTION COUPLINGS

BACKGROUND OF THE INVENTION

This invention relates to mechanism for automatically maintaining a uniform release clearance (and therefore a uniform actuating stroke) for brakes and similar equipment. Mechanisms of this type are commonly used in brake systems to compensate for wear of the brake linings and other brake parts and are popularly called "automatic brake adjusters." Although the present invention is explained here in connection with brakes, the mechanism has utility in other environments where similar wear compensation is needed such as in clutches.

The basic brake adjuster designs have included mechanical adjusters with special ratchets or friction dragging parts to provide the adjustment for wear. Also hydraulic adjusters utilizing the metering of hydraulic fluid have been used.

The mechanical brake adjusters have required specially machined parts and these machined parts have been relatively costly to manufacture. This has increased the cost of servicing the adjusters when replacement has been necessary. There has also been a problem in determining when replacement of these machined parts is needed. It is highly undesirable to wait until there is failure or malfunction of the adjuster parts before replacing the parts because of the adverse affect on the braking efficiency and the unscheduled maintenance which can cause grounding of an aircraft until a repair of the adjuster is made. It has been proposed to use a ductile deformable tubular member which can be replaced each time the friction members are replaced to provide the adjustment for wear. This device requires a special construction of the adjusters because the deformation of the tubular member must be in tension as by pulling an enlarged deformed member through the tube. There also are problems removing the deforming member from the tubular member before it can be replaced. Furthermore, the ductile material must have a specified softness for satisfactory operation.

SUMMARY OF THE INVENTION

The brake adjuster assembly of the present invention includes a relatively low cost part which is easily replaced each time the friction members are replaced. The material for this part need not have special properties and there are no problems in removing it from the retractor assembly. The replaceable member is cut by a cutting member to provide the relative axial movement of the adjuster parts to compensate for wear of the friction members. The cutting member may be slidably mounted within a tubular replaceable member which may be slotted and grooved to position the cutters on the cutting member and guide the cutting movement. The cutting member and the replaceable tubular member are mounted in the retractor so that they move together a predetermined distance during application of the brake and upon further displacement, the replaceable tubular member is cut by the cutting member to compensate for wear of the friction members. Then upon release of the brake, a retracting spring returns the cutting tool and tubular replaceable member the same predetermined distance with the adjustment for wear having been made by the cutting of the replaceable tubular member.

The accompanying drawings show one preferred form and a modification of a brake retractor made in accordance with and embodying this invention and which are representative of how this invention may be practiced.

BRIEF DESCRIPTION OF THE DRAWINGS

In the drawings:

FIG. 1 is a longitudinal cross section of the retractor assembly installed in a typical disc brake, the assembly being in the condition its parts occupy when the brake is retracted or released, the brake parts being shown in generalized or somewhat schematic form with some parts being broken away.

FIG. 2 is a sectional view of the cutting member taken along the plane of line 2—2 of FIG. 1.

FIG. 3 is a plan view of the tubular member shown in FIG. 1.

FIG. 4 is an end view taken along the plane of line 4—4 of FIG. 3.

FIG. 5 is a fragmentary view corresponding to FIG. 1 except that it shows the retractor assembly in the condition where the brake is engaged and the parts of the retractor assembly are in position to compensate for wear of the brake friction faces.

FIG. 6 is a view like FIG. 3 of a modified tubular member.

FIG. 7 is an end view taken along the plane of line 7—7 of FIG. 6.

DETAILED DESCRIPTION

A brake retractor assembly 10 including an adjuster assembly 11 is shown in FIG. 1 mounted rigidly in a torque frame 12 of a brake. In this embodiment, the torque frame 12 carries a splined disc 13 in parallel axial alignment with a rotatable lining carrier 14. The latter is in splined engagement at its outer periphery with rotary member 15 which may be part of a wheel of a vehicle or aircraft with which the brake is associated.

The brake is actuated and the brake members engaged by a hydraulic piston 16 mounted in a cylinder 17 in the torque frame 12. A passage 18 in the frame 12 leading to the cylinder 17 may be connected to a source of hydraulic pressure for actuating the piston 16 to urge a pressure plate 19 which is splined to the frame against the lining carrier 14 and therefore force it into frictional engagement with the lining carrier, adjacent brake disc 13 and reaction plate 22 of the torque frame. The brake parts as shown in FIG. 1 are in the released condition with the splined brake disc 13 and pressure plate 19 out of engagement with the lining carrier 14.

The adjuster assembly 11 includes a sleeve 23 which may be in slidable relationship with a cylindrical opening 24 in an adjuster assembly housing 25. The housing 25 may be adapted for mounting in the torque frame 12 or be integral therewith as shown in FIG. 1. A movable member such as retractor rod 26 extends through the sleeve 23 and towards the brake members where it is connected to the pressure plate 19 by insertion of an enlarged head 27 of the retractor rod in a slot 28 of the pressure plate as shown in FIG. 1 or by other arrangements well known in the art.

The sleeve 23 has a radially outward extending flange 29 at the outer end for limiting the axial movement of the sleeve through engagement with a shoulder 32 of the housing 25 and a spring-loaded retaining ring 33 set in a groove 34 in the housing. The axial distance through which the sleeve 23 moves is predetermined by the spacing, indicated by the letter "X" in FIG. 1, between the surface of the shoulder 32 and the surface of the radially extending flange 29. A helical coiled retractor spring 35 is housed inside the housing 25 concentrically surrounding the sleeve 23 of the adjuster assembly 11. The spring 35 is caged in a preloaded compressed condition with the right end coil of the spring (as viewed in FIG. 1) bearing against the inner end wall of a second shoulder 36 of the housing 25 and the left end coil bearing against the radially extending flange 29 of sleeve 23. The retaining ring 33 engaging the radially extending flange 29 holds the retractor spring 35 in compression.

At the right end of the sleeve 23 (as viewed in FIG. 1), a radially inward extending flange 37 has a stepped inner face 38 for supporting a tubular member such as tubing 39 disposed in concentric relationship within the sleeve 23 and surrounding the retractor rod 26. This tubing 39 may be of a standard warehouse steel such as round mechanical tubing of 1020 carbon steel, fluid line cold drawn, soft annealed tubing of 1010 steel or cold drawn, annealed 304 stainless tubing.

At the left end of the retractor rod 26 (as viewed in FIG. 1), a cutting member 42 is mounted on the retractor rod as by a nut 43 threaded on the end of the rod. The cutting member 42 has a hub 44 with an outer diameter substantially the same as the inner diameter of the tubing 39 for sliding movement of the hub axially of the tubing. Cutter tools 45 and 46 are mounted on the hub 44 on opposite sides and have sloping cutting edges 47 and 48 for engaging the tubing 39.

As shown in FIGS. 3 and 4, the tubing 39 has slots 49 and 52 for receiving the cutter tools 45 and 46 in the initial condition of the adjuster assembly 11, as shown in FIG. 1. The tubing 39 also has grooves 53 and 54 in alignment with the cutter tools 45 and 46 of the cutting member 42 which reduces the thickness of the tubing and thereby scores the surface of the tubing to facilitate cutting by the cutter tools.

When the brake is operated by communicating hydraulic fluid to piston 16 and the latter displaces the pressure plate 19 towards the lining carrier 14, splined disc 13 and reaction plate 22, the rod 26 is pulled axially through the cylindrical opening 24 in the housing 25. The adjuster assembly 11 including the sleeve 23 is pulled in the same direction overcoming the force of the retractor spring 35 and moving the adjuster assembly until radially extending flange 29 engages the shoulder 32 of the housing 25. If there is no appreciable wear or other conditions materially changing the release clearance between the braking members 13, 14, 19 and 22 while these members are engaged, then rod 26 will not be axially displaced an amount sufficient to cause any relative change in the position of the rod within the adjuster assembly 11.

The adjuster assembly 11 is designed so that the dimension designated by X in FIG. 1 is the distance between the shoulder 32 and flange 29 and equal to the maximum allowable release clearance between the pressure plate 19 and the adjoining braking members 13, 14 and 22. So long as the release clearance does not exceed an amount indicated by dimension X, the relative position of the cutting member 42 within the tubing 39 will remain the same and the braking members may be engaged and released repeatedly.

Owing to the erosion of the brake lining as the brake is used, the release clearance between the retracted position of the pressure plate 19 and the adjoining braking members 13, 14 and 22 tends to increase progressively. The existence of this condition is automatically sensed in this mechanism because rod 26 and pressure plate 19 can be displaced for whatever distance it is necessary to bring about brake engagement regardless of wear. Accordingly, whenever the pressure plate 19 and rod 26 are moved through a distance greater than that equal to dimension X in order to engage the braking members 13, 14 and 22, the cutting member 42 will be forced against the tubing 39 and the cutter edges 47 and 48 will cut into the tubing in a manner shown in FIG. 5. The extent of the cutting will be equal to the wear of the friction linings on lining carrier 14 and, as shown by way of example only in FIG. 5, the cutting member 42 has moved relative to the tubing 39 a distance indicated by dimension "Y".

On the subsequent release of fluid pressure against the piston 16, the force of the retractor spring 35 against flange 29 will return the adjuster assembly 11 to the fully retracted position. Accordingly, the retractor rod 26 will return the pressure plate 19 to a retracted position. Then since actuation forces have been removed from braking members 13, 14, 19 and 22, the brake will revert to its free position. The retraction stroke is limited by the distance flange 29 and the entire adjuster assembly 11 can move and therefore the rod 26 is retracted only a distance equivalent to dimension X. A new starting position is then established for rod 26 and the pressure plate 19 in which the release clearance between the pressure plate and the braking members 13, 14, 19 and 22 is again equal to dimension X.

The progressive relocation of the starting position of the rod 26 and the pressure plate 19 in this manner does not change the maximum deflection amplitude of the retractor spring 35. The retractor spring deflection amplitude remains substantially the same on every actuation from the time the brake is new until the lining is entirely worn out.

When the brake is released, there is no source of force ordinarily tending to urge the rod 26 toward the braking members as shown in FIG. 1 and the engagement of the cutter tools 45 and 46 with the tubing is adequate to maintain the rod in any adjusted position.

After the lining carrier 14 is worn to a point where the replacement is necessary, the tubing 39 may be replaced simply by removing the hub 44 from the end of the retractor rod 26 pulling out the cut tubing and replacing it with a new piece of tubing.

As shown in FIGS. 6 and 7, smooth tubing 55 may be used in place of the grooved tubing 39 and may be of the same material but with a wall of less thickness. Slots 52' and 49' may be provided at the ends to accommodate the cutter tools 45 and 46.

Depending on the size of the brake, one or a number of these adjuster assemblies 11 may be used in axially spaced positions around the torque frame 12.

I claim:

1. An adjuster assembly for regulating the release clearance between two selectively engageable parts such as friction brake or clutch parts to compensate for wear in such parts comprising a pair of generally concentric members, one of said members being tubular with a tube wall, a first member of said concentric members adapted for axial displacement in response to actuation and release movement of its associated engageable parts, a second member of said concentric members being mounted on said assembly for limited axial movement with the corresponding movement of said first member, a cutting member mounted on one of said concentric members for cutting engagement with said member having a tube wall, means to arrest said second member so that said concentric members are adapted for relative axial movement by cutting apart portions of said tube wall of said concentric member having a tube wall by said cutting member an amount equal to the wear of such friction brake or clutch parts.

2. An adjuster assembly for regulating the release clearance between two selectively engageable parts such as friction brake or clutch parts to compensate for wear in such parts comprising a pair of generally concentric members, an inner member of said concentric members adapted for axial displacement in response to actuation and release movement of its associated engageable parts, an outer tubular member of said concentric members being mounted on said assembly for limited axial movement with the corresponding movement of said inner member, a cutting member mounted on said inner member for cutting engagement with said tubular member, means to arrest said tubular member so that said inner member is adapted for further displacement relative to said tubular member by cutting of said tubular member by said cutting member an amount equal to the wear of such friction brake or clutch parts.

3. An assembly according to claim 2 wherein said cutting member further comprises a hub member slidable within said tubular member and a cutter tool extending radially outward from said hub for cutting engagement with said tubular member.

4. An assembly according to claim 3 wherein said tubular member has an axially extending slot at one end having a width generally the same as the width of said cutter tool for initial positioning of said hub member within said tubular member.

5. An assembly according to claim 3 wherein said tubular member has an axially extending groove providing a reduced wall thickness for cutting by said cutter tool.

6. An assembly according to claim 2 wherein said cutting member further comprises a hub member slidable within said tubular member and opposed cutter tools extending radially outward from said hub on opposite side thereof for cutting engagement with said tubular member.

7. An assembly according to claim 2 further comprising a housing secured in a torque frame, a sleeve member supporting said tubular member at one end, means for supporting said sleeve member in said housing for relative axial movement, a retractor spring interposed between said sleeve member and said housing and being compressed between an anchorage on said housing and a spring-retaining member at one end of said sleeve member, said means for arresting such axial movement of said tubular member further comprising stop means on said housing engageable with said sleeve member to limit axial movement of said sleeve member during actuation of said assembly to a predetermined distance prior to cutting of said tubular member by said cutting member, and retaining means on said housing engageable with said sleeve member for limiting retracting movement of said sleeve member by said retractor spring.

8. An assembly according to claim 7 wherein said tubular member is mounted on said sleeve member at said one end and is engageable with said cutting member at an opposite end.

9. An assembly according to claim 7 wherein said retractor spring is preloaded in the released condition of said assembly.

* * * * *